United States Patent Office 3,456,011
Patented July 15, 1969

3,456,011
PHENETHYLAMINO-2-PROPANONES
Andre L. Langis, Montreal, Quebec, Canada, assignor to American Home Products Corporation, New York, N.Y., a corporation of Delaware
No Drawing. Filed Mar. 23, 1967, Ser. No. 625,331
Int. Cl. C07c 87/28
U.S. Cl. 260—570.8     5 Claims

ABSTRACT OF THE DISCLOSURE $\alpha,\alpha$-Dimethyl-$\beta$-phenylaminopropanone and p-chloro-$\alpha,\alpha$-dimethyl-$\beta$-phenethylaminopropanone, which compounds have anorexiant activity.

---

The present invention relates to $\alpha,\alpha$-dimethyl-$\beta$-phenethylaminopropanones and to their pharmacologically acceptable salts, in particular the hydrochloride salts.

The compounds of this invention lower the appetite for food and are useful as anorexiant agents. They appear to be substantially free from detectable undersirable side-effects such as, for example, elevation of blood pressure, increase in heart rate, and increase in spontaneous activity. They may be administered orally, preferably in the form of their pharmacologically acceptable salts such as, for example, the hydrochloride salts, formulated with suitable excipients in the form of tablets, or capsules containing from 25–100 mg. of the active ingredient.

More specifically the compounds of this invention may be represented by the formula

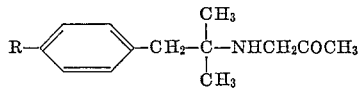

in which R represents hydrogen or chlorine. They may be conveniently prepared by reacting $\alpha,\alpha$-dimethylphenethylamine or $\beta$-(p-chlorophenyl)$\alpha,\alpha$-dimethylethylamine with 2-chloropropanone in the presence of sodium carbonate followed by solvent extractions and purification. The compounds of this invention may then be reacted with pharmacologically acceptable acids to form the corresponding salts.

The following formulae, in which R is as defined above, and examples will illustrate this invention.

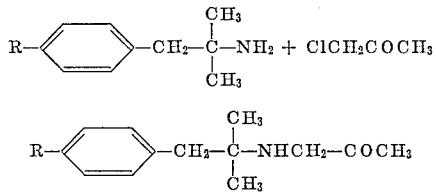

EXAMPLE 1 p-Chloro-$\alpha,\alpha$-dimethyl-$\beta$-phenethylaminopropanone

To a solution of 5 g. (0.0272 mole) of p-chloro-$\alpha,\alpha$-dimethyl-$\beta$-phenethylamine in 40 ml. of isopropanol there is added 2.93 g. (0.0285 mole) of anhydrous sodium carbonate 4.5 ml. of distilled water and 2.53 g. (0.0274 mole) of chloropropanone. This mixture is refluxed for 20 hours with stirring. The solvent is removed under reduced pressure and the residue distributed between 40 ml. of water and 25 ml. of benzene. The separated organic layer is washed with three 10 ml. portions of water, dried on magnesium sulfate and evaporated to dryness in vacuo, yielding the title compound as a yellowish-red oil, characterized by I.R. absorption bands at 3300, 1725, 1490, 1050 cm.$^{-1}$.

The above free base is dissolved in 30 ml. of dryether, filtered, and the filtrate is saturated wih dry hydrogen chloride gas at appr. 5° C. the crystalline precipitate is filtered, and washed with dry ether, and recrystallized from 17.5 ml. of isopropanol, to yield the hydrochloride salt of the title compound, M.P. 196.5–200° C.

EXAMPLE 2

$\alpha,\alpha$-Dimethyl-$\beta$-phenethylaminopropanone

To a solution of 45.5 g. (0.305 mole) of $\alpha,\alpha$-dimethylphenethylamine in 200 ml. of isopropanol are added 32.0 g. of sodium carbonate, 40 ml. of distilled water and at reflux 28.2 g. of chloro-2-propanone are added dropwise. This mixture is refluxed for 20 hours with stirring. The solvent is removed under reduced pressure and the residue is dissolved in 150 cc. of benzene, washed with three 30 ml. portions of water, dried over sodium sulfate and evaporated to dryness in vacuo, yielding the title compound as an oil characterized by I.R. absorption bands at 3300, 1725, 1366, 1175 cm.$^{-1}$.

The oil is dissolved in dry ether and saturated with dry hydrogen chloride. A crystalline white precipitate is filtered, washed with dry ether and recrystallized from ethanol to give the hydrochloride salt of the title compound with M.P. 220–222° C.

I claim:
1. A compound selected from the group which consists of compounds of the formula

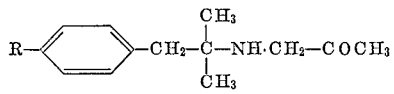

wherein R represents hydrogen or chlorine, and the hydrochloride salts thereof.
2. p-Chloro-$\alpha,\alpha$-dimethyl-$\beta$-phenethylaminopropanone.
3. $\alpha,\alpha$-Dimethyl-$\beta$-phenethylaminopropanone.
4. The hydrochloride salt of p-chloro-$\alpha,\alpha$-dimethyl-$\beta$-phenethylaminopropanone.
5. The hydrochloride salt of $\alpha,\alpha$-dimethyl-$\beta$-phenethylaminopropanone.

References Cited

UNITED STATES PATENTS 3,308,019   3/1967   Kopf et al. _____ 260—570.8 X

ROBERT V. HINES, Primary Examiner

U.S. Cl. X.R.
424—330